(12) United States Patent
Whitton et al.

(10) Patent No.: US 6,942,415 B2
(45) Date of Patent: Sep. 13, 2005

(54) SHAFT ASSEMBLY SAFETY MECHANISM

(75) Inventors: Andrew J. Whitton, Simpsonville, SC (US); Harry Heilemann, Clemson, SC (US); Donald C. Taylor, Laurens, SC (US)

(73) Assignee: The Torrington Company, Torrington, CT (US)

( * ) Notice: Subject to any disclaimer, the term of this patent is extended or adjusted under 35 U.S.C. 154(b) by 14 days.

(21) Appl. No.: 10/085,649

(22) Filed: Feb. 26, 2002

(65) Prior Publication Data

US 2003/0161679 A1 Aug. 28, 2003

(51) Int. Cl.⁷ ................................................ F16D 3/00
(52) U.S. Cl. .................... 403/27; 403/12; 403/289; 403/57; 464/134; 464/182
(58) Field of Search ................... 403/315–320, 403/345, 346, 342, 343, 388, 259, 290, 27, 57, 12; 464/134–136, 182

(56) References Cited

U.S. PATENT DOCUMENTS

| | | | | |
|---|---|---|---|---|
| 1,258,233 A | * | 3/1918 | McCaskey | 464/182 X |
| 1,602,691 A | * | 10/1926 | McCaskey | 464/182 X |
| 1,684,919 A | * | 9/1928 | Keyser | 464/182 X |
| 2,007,513 A | * | 7/1935 | Westburgh | 464/182 X |
| 2,499,490 A | | 3/1950 | Good | 464/134 |
| 2,678,460 A | * | 5/1954 | Oishei | 464/182 X |
| 2,910,842 A | * | 11/1959 | Sensenig | 464/182 |
| 3,485,062 A | * | 12/1969 | Blake | 464/182 X |
| 3,992,119 A | * | 11/1976 | Recker | 403/316 |
| 4,537,523 A | * | 8/1985 | Haldric | |
| 4,540,385 A | | 9/1985 | Krude | |
| 4,628,758 A | * | 12/1986 | Yuzuriha et al. | |
| 4,861,240 A | * | 8/1989 | Marioni et al. | |
| 4,899,611 A | * | 2/1990 | Pinna | |
| 4,900,178 A | | 2/1990 | Haldric et al. | |
| 5,076,723 A | | 12/1991 | Berger | |
| 5,090,833 A | | 2/1992 | Oertle et al. | |
| 5,165,817 A | | 11/1992 | Hoblingre et al. | |
| 5,188,474 A | | 2/1993 | Ohkubo et al. | |
| 5,324,235 A | * | 6/1994 | Tomii et al. | 464/136 |
| 5,358,350 A | | 10/1994 | Oertle | |
| 5,403,111 A | | 4/1995 | Wey | |
| 5,575,581 A | | 11/1996 | DeBisschop | |
| 5,580,180 A | | 12/1996 | DeBisschop et al. | |
| 5,628,578 A | | 5/1997 | McClanahan et al. | |
| 5,788,400 A | * | 8/1998 | Wey | 403/319 X |
| 5,813,788 A | | 9/1998 | Yamamoto et al. | |
| 5,816,113 A | * | 10/1998 | Fohl | 403/319 X |
| 5,894,628 A | | 4/1999 | Egner-Walter et al. | |
| 5,941,131 A | * | 8/1999 | Fohl | 403/319 X |
| 6,135,667 A | | 10/2000 | Debisschop | |
| 6,155,739 A | | 12/2000 | Sekine et al. | |
| 6,474,898 B1 | * | 11/2002 | Aota et al. | 403/290 X |

FOREIGN PATENT DOCUMENTS

JP          2000-249157          9/2000

* cited by examiner

Primary Examiner—John R. Cottingham
Assistant Examiner—Ryan M. Flandro
(74) Attorney, Agent, or Firm—Michael Best & Friedrich LLP

(57) ABSTRACT

A shaft coupling assembly comprising a coupling element including a shaft-receiving slot configured to receive a shaft. A retaining bolt is extendable through the coupling element adjacent the shaft receiving slot and to be received and retained in a bolt receiving recess in the upper shaft surface adjacent the forward shaft end after the shaft forward end is inserted in the coupling element slot. At least one projection extends from the shaft forward end adjacent the shaft upper surface to prevent improper clamping of the shaft forward end and any associated feeling of proper interconnection.

15 Claims, 6 Drawing Sheets

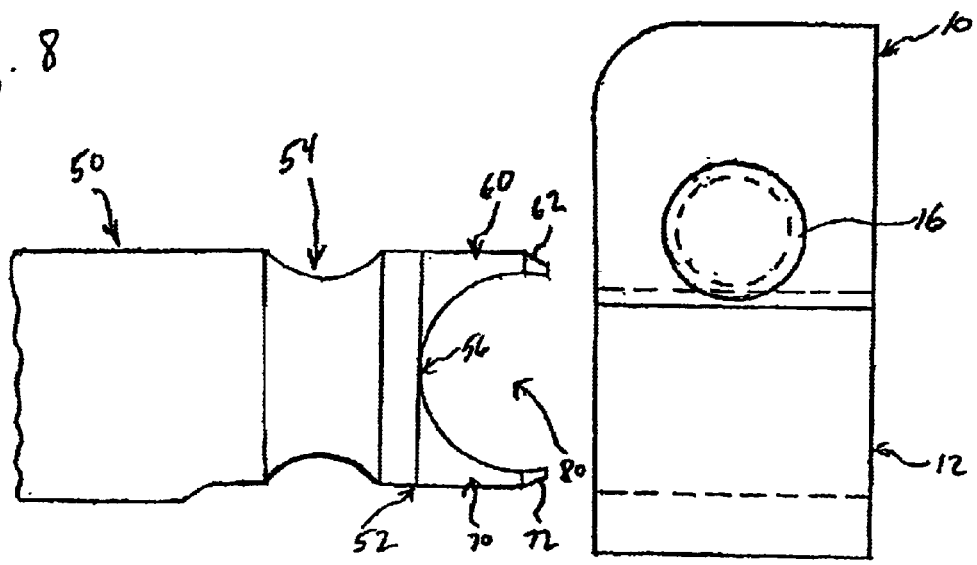
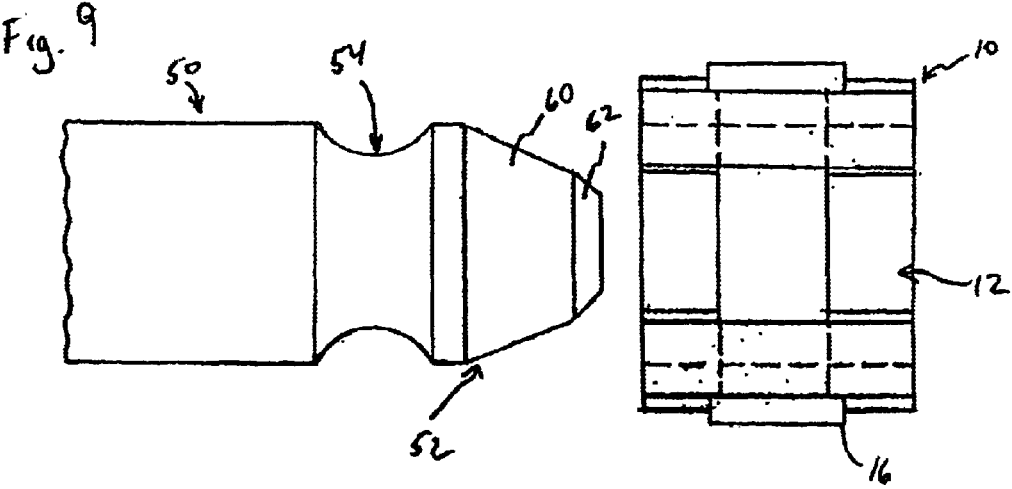

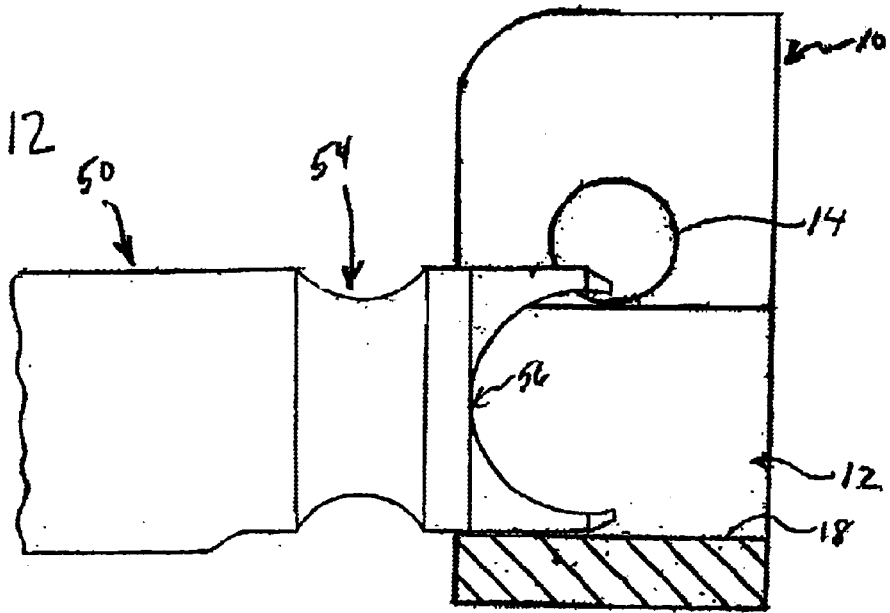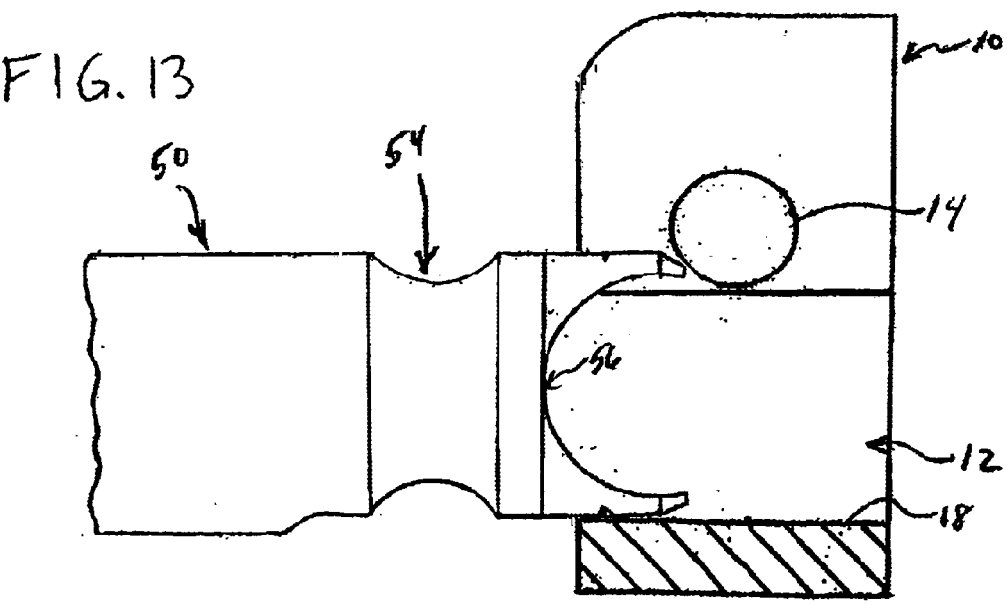

SHAFT ASSEMBLY SAFETY MECHANISM

BACKGROUND

The present invention relates to shaft components. More particularly, the present invention relates to a safety mechanism for reducing the likelihood of an improper shaft assembly.

Shafts are utilized in many applications and generally require interconnection between the shaft and a secondary component. The secondary component can be an independent component or secondary shafts such that the shaft serves as an intermediate shaft. In both instances, the forward end 22 of the shaft 20 is interconnected with a coupling element 10 which in turn is interconnected with the secondary component (not shown).

Many different coupling elements can be utilized with the present invention, with an exemplary coupling element 10 illustrated in FIG. 1. The coupling element 10 has a shaft receiving and retaining slot 12 and a retaining bolt 16 that is passed through and secured in a through bore 14 in the coupling element 10. Typically, the shaft 20 has a notch, annular groove or other form of bolt receiving recess 24 adjacent the forward end 22 of the shaft 20. The forward end 22 of the shaft 20 is first positioned in the slot 12 (as indicated by the arrow 1 in FIG. 1) with the bolt receiving recess 24 aligned with the through bore 14. Thereafter, the retaining bolt 16 is slid through the through bore 14 and bolt receiving recess 24 (as indicated by the arrow 2 in FIG. 1) and secured by a cotter pin, nut or the like. The retaining bolt 16 extending through the bolt receiving recess 24 permanently secures the shaft 20 to the coupling element 10.

In many applications, for example, a steering intermediate shaft, the interconnection of the shaft 20 and coupling element 10 occurs in a location with limited accessibility. As such, it is difficult to visually or manually check that the retaining bolt 16 is properly received in the bolt receiving recess 24. For example, as illustrated in FIG. 2, the shaft 20 may not be fully inserted into the coupling element slot 12 when the retaining bolt 16 is inserted. As a result, the retaining bolt 16 is not received in the bolt receiving recess 24. In some instances, the forward end 22 of the shaft 20 jams between the inserted retaining bolt 16 and the inner surface 18 of the coupling element slot 12. If the shaft 20 is jammed sufficiently, it may give a rigid feeling to an assembly worker, thereby creating a false sense that the shaft 20 is properly interconnected. After some use, the shaft end 22 may dislodge from between the retaining bolt 16 and slot surface 18, thereby causing disassembly and failure of the coupling.

SUMMARY

The present invention provides a shaft coupling assembly. The assembly comprises a coupling element including a shaft-receiving slot configured to receive a shaft. A retaining bolt is extendable through the coupling element adjacent the shaft receiving slot. The shaft includes an axial shaft body having upper and lower surfaces and terminating in a forward end configured to be inserted into the coupling element slot. A bolt receiving recess in the upper shaft surface adjacent the forward shaft end is configured to receive and retain the retaining bolt after the shaft forward end is inserted into the coupling element slot. At least one projection extends from the shaft forward end adjacent the shaft upper surface whereby, in the event the retaining bolt is extended through the coupling element prior to proper insertion of the shaft forward end into the coupling element slot, the projection contacts the retaining bolt and prevents improper clamping of the shaft forward end and any associated feeling of proper interconnection.

BRIEF DESCRIPTION OF THE DRAWINGS

FIG. 8 is a side elevation view of a shaft of a second embodiment of the present invention positioned for engagement with an exemplary coupling element.

FIG. 9 is a top elevation view of the shaft of FIG. 8 positioned for engagement with an exemplary coupling element.

FIGS. 12–13 are side elevation views, with the coupling element shown in cross section, of the shaft of FIG. 8 improperly inserted into the coupling element.

DETAILED DESCRIPTION OF THE PREFERRED EMBODIMENTS

The present invention will be described with reference to the accompanying drawing figures wherein like numbers represent like elements throughout. Certain terminology, for example, "right", "left", "front", "frontward", "forward", "back", "rear" and "rearward", is used in the following description for relative descriptive clarity only and is not intended to be limiting.

Figure 1:
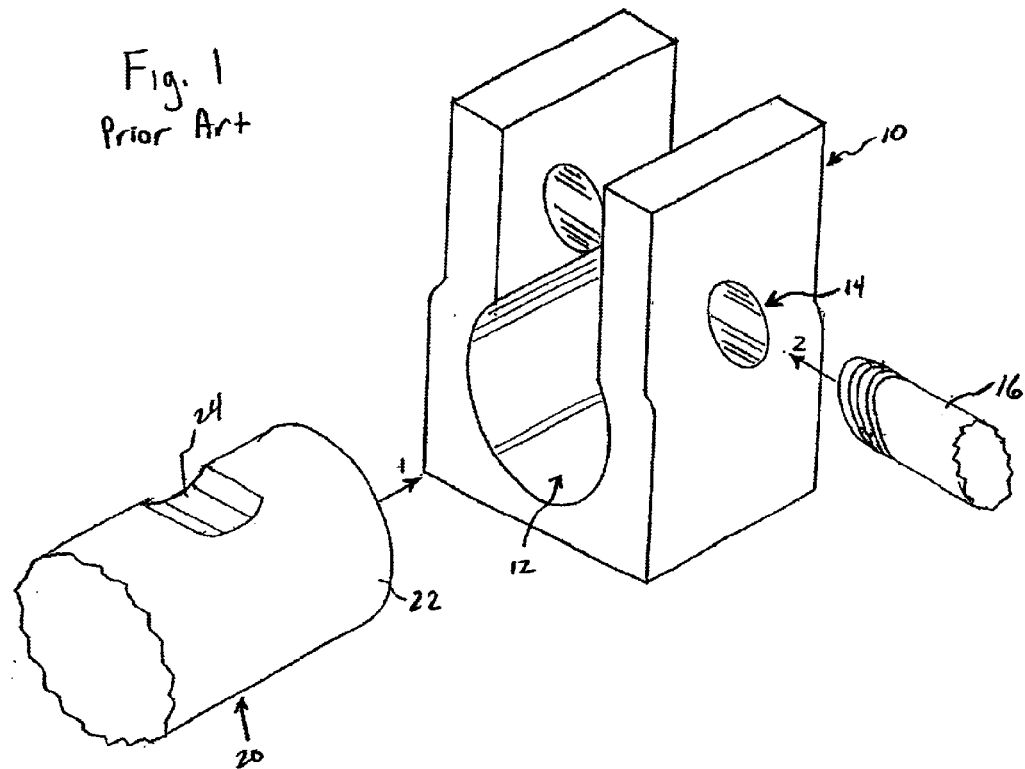
FIG. 1 is an isometric view of a prior art shaft positioned for engagement with an exemplary coupling element.
Figure 2:
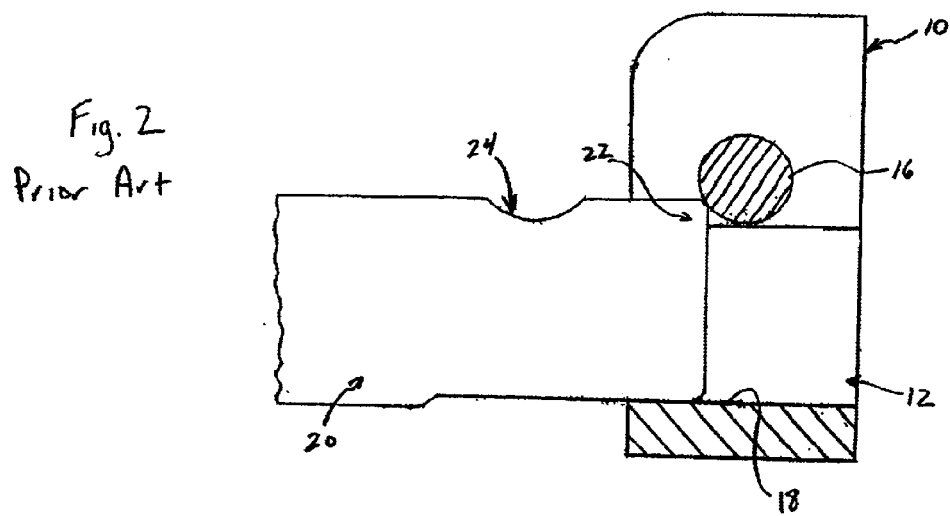
FIG. 2 is a side elevation view, with the coupling element shown in cross section, of a prior art shaft improperly interconnected with the coupling element.
Figure 3:
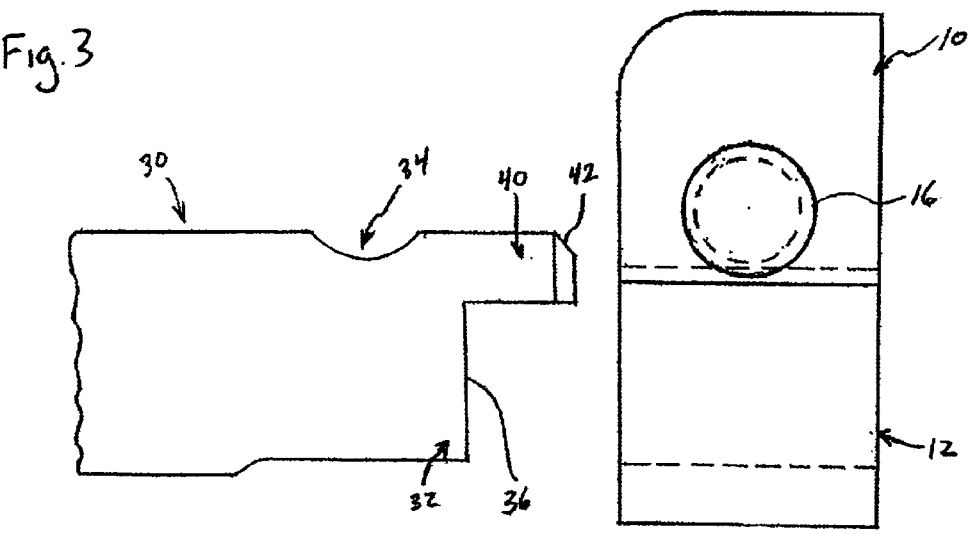
FIG. 3 is a side elevation view of a shaft of a first embodiment of the present invention positioned for engagement with an exemplary coupling element.
Figure 4:
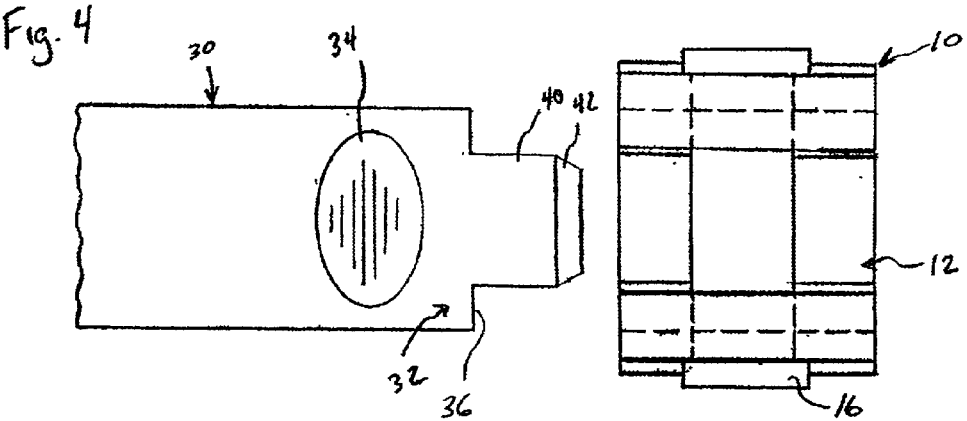
FIG. 4 is a top elevation view of the shaft of FIG. 3 positioned for engagement with an exemplary coupling element.
Figure 5:
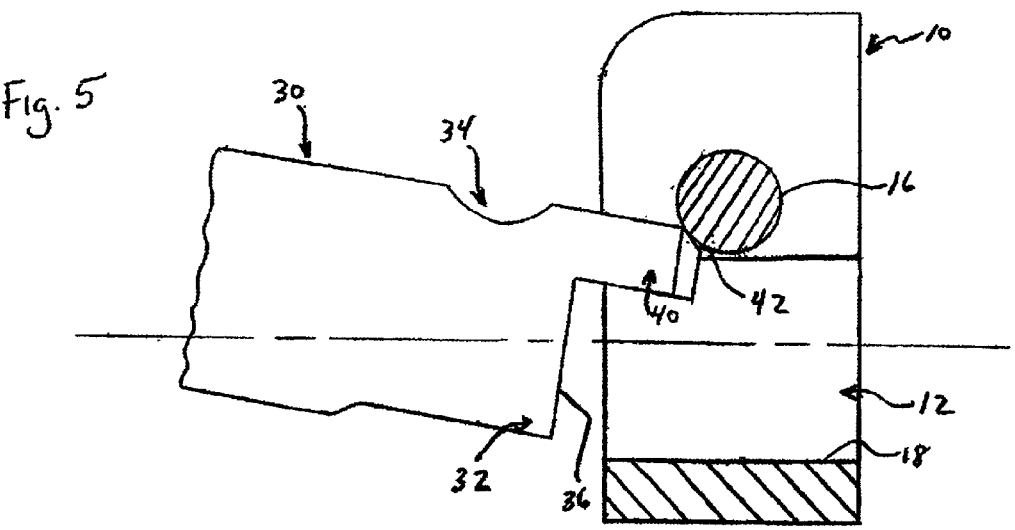
FIGS. 5–7 are side elevation views, with the coupling element shown in cross section, of the shaft of FIG. 3 improperly inserted into the coupling element.

Referring to FIGS. 3–5, a shaft 30 of the first embodiment of the present invention is shown. The shaft 30 has an axial body extending between a forward end 32 and a rear end (not shown). The shaft 30 includes a bolt receiving recess 34 adjacent the forward end 32 of the shaft 30. The bolt receiving recess 34 is similar to the bolt receiving recess 24 of the prior art shaft 20 and is configured and positioned to receive the retaining bolt 16. The shaft 30 generally terminates in a blunt end 36 forward the bolt receiving recess 34. The shaft 30 has a generally complete cross-sectional area at the bolt receiving recess 34 such that a secure engagement occurs between the retaining bolt 16 and bolt receiving recess 34. A projection 40 extends from the generally blunt end 36 adjacent the top surface of the shaft 30. The projection 40 preferably terminates in a tapered tip 42.

Figure 6:
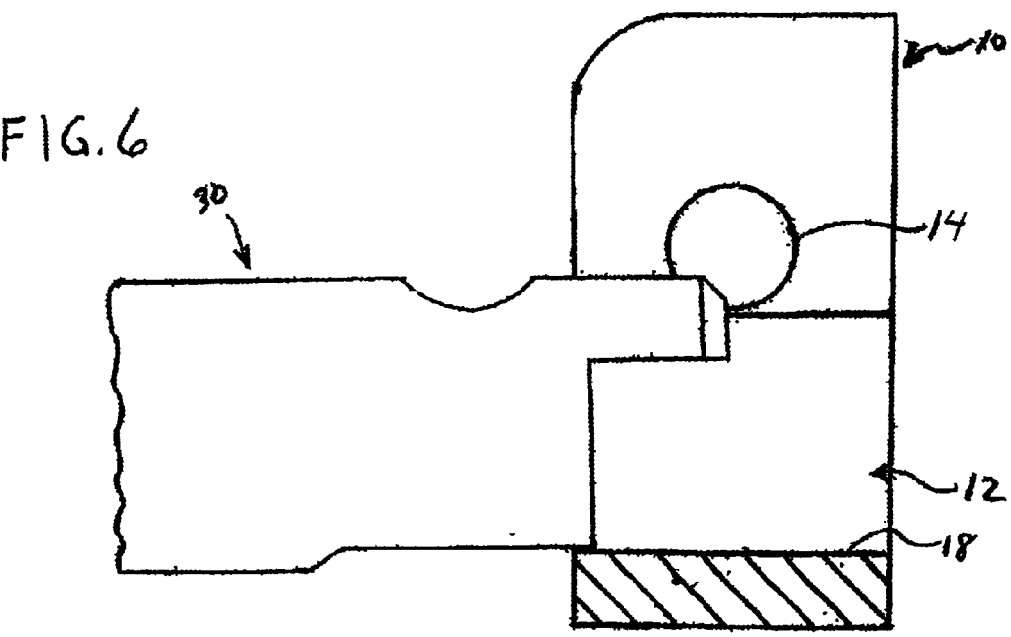
Figure 7:
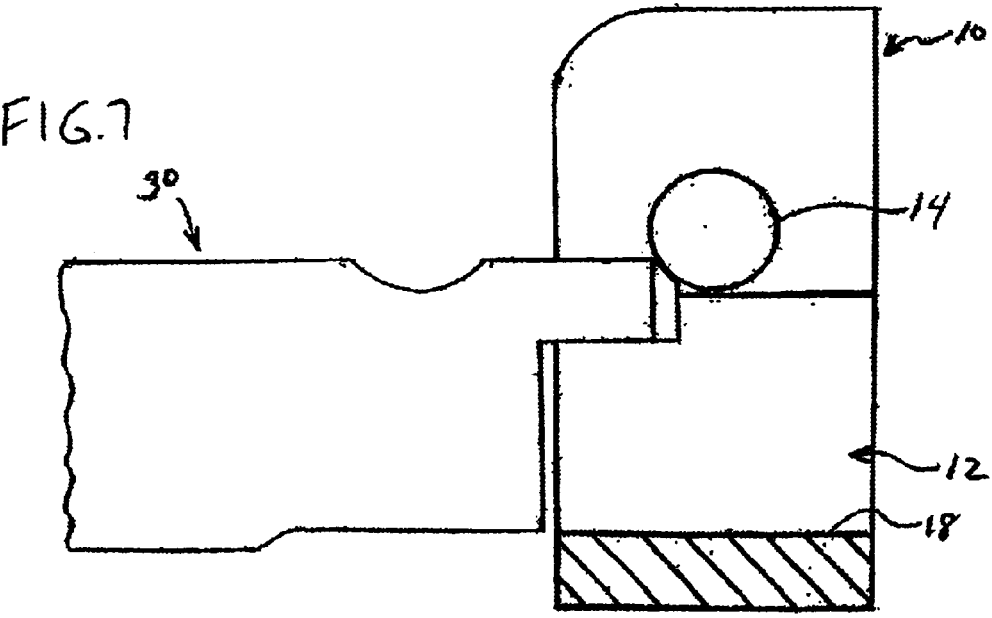

Referring to FIGS. 5–7, the projection 40 extending from the shaft 30 prevents a false sense of proper interconnection between the shaft 30 and the coupling element 10 that may be experienced with the prior art shaft 20. As illustrated in FIG. 5, if the retaining bolt 16 is inserted prior to insertion and proper positioning of the shaft 30, the tapered tip 42 of the projection 40 first contacts the retaining bolt 16, thereby causing the shaft 30 to tilt out of the proper axial alignment. Tilting of the shaft 30 provides an assembly worker with a visual indication that something, most likely an improperly inserted retaining bolt 16, is preventing proper insertion of the shaft 30 into the coupling element 10. Referring to FIGS. 6 and 7, if the shaft 30 is only partially inserted, the projection tip 40 will help prevent a false sense of proper interconnection. As shown in FIG. 6, the projection 40 may block the through bore 14, thereby preventing insertion of the bolt 16 until the shaft 30 is properly inserted. Referring to FIG. 7, the projection 40 is preferably a length at least equal to the distance from the through bore 14 to the entry of the slot 12. As such, the full cross-sectional area of the shaft 30 is not received into the slot 12 until at least a portion of the projection 40 is blocking the through bore 14. Due to the reduce cross-sectional area, it is not possible for the coupling element 10 to clamp onto the forward end of the shaft 30.

Referring to FIGS. 8–13, a shaft 50 of the second embodiment of the present invention is shown. The shaft 50 has an axial body extending between a forward end 52 and a rear end (not shown). The shaft 50 includes a bolt receiving recess 54 adjacent the forward end 52 of the shaft 50. The bolt receiving recess 54 is similar to the bolt receiving recess 24 of the prior art shaft 20 and is configured and positioned to receive the retaining bolt 16. The shaft 50 generally terminates at end surface 56 forward the bolt receiving recess 54. Again, the shaft 50 has a generally full area at the bolt receiving recess 54 such that a secure engagement occurs between the retaining bolt 16 and bolt receiving recess 54. A top projection 60 extends from the end surface 56 adjacent the top surface of the shaft 50 and a bottom projection 70 extends from the end surface 56 adjacent the bottom surface of the shaft 50 with an open space 80 defined therebetween. Each projection 60, 70 terminates in a tapered tip 62, 72, respectively. Referring to FIGS. 8 and 9, each projection 60, 70 preferably narrows moving forward from the end surface 56 in both the vertical direction (FIG. 6) and the horizontal direction (FIG. 7). As such, each projection 60, 70 has a slight flexibility.

Figure 10:
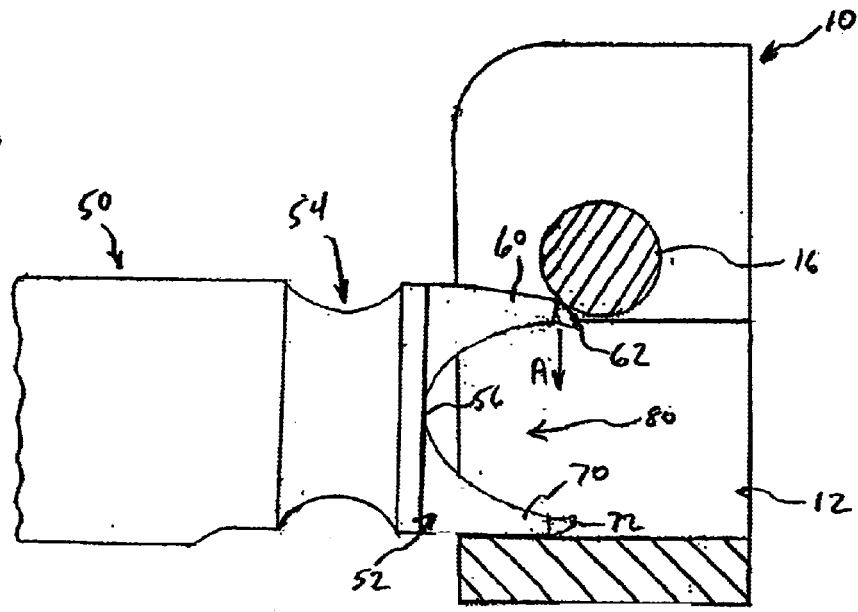
FIG. 10 is a side elevation view, with the coupling element shown in cross section, of the shaft of FIG. 8 initially improperly inserted into the coupling element.
Figure 11:
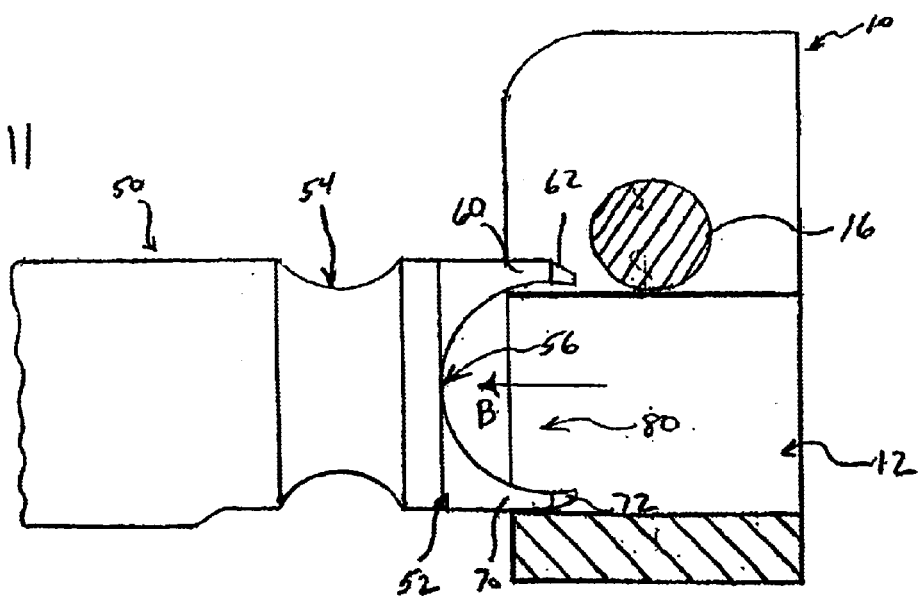
FIG. 11 is a side elevation view similar to FIG. 10, illustrating the improperly inserted shaft automatically withdrawing from the coupling element.

Referring to FIGS. 10–13, the projections 60 and 70 extending from the shaft 50 prevent the false sense of proper interconnection between the shaft 50 and the coupling element 10 and further automatically withdraw a shaft 50 that is improperly inserted after insertion of the retaining bolt 16. As illustrated in FIGS. 10 and 11, if the retaining bolt 16 is inserted prior to insertion and proper positioning of the shaft 50, the tapered tip 62 of the projection 60 first contacts the retaining bolt 16, thereby causing the projections 60 and 70 to compress between the retaining bolt 16 and the slot inner surface 18 with projection 60 flexing inward toward the open area 80 as indicated by arrow A in FIG. 10. Compression of the projections and thereby flexing of projection 60 creates an axial spring force in the direction of arrow B in FIG. 11. The created spring force causes the improperly assembled shaft to "pop" from the coupling element slot. The withdrawing shaft 50 again provides an assembly worker with a visual indication that something, most likely an improperly inserted retaining bolt 16, is preventing proper insertion of the shaft 50 into the coupling element 10 and prevents any false sense of proper interconnection.

Referring to FIGS. 12 and 13, if the shaft 50 is only partially inserted, the projection tips 60 and 70 will help prevent a false sense of proper interconnection. As shown in FIG. 12, the top projection 60 may block the through bore 14, thereby preventing insertion of the bolt 16 until the shaft 50 is properly inserted. Referring to FIG. 13, the open space 80 between the projections 60 and 70 extends a length at least equal to the distance from the through bore 14 to the entry of the slot 12. As such, the full cross-sectional area of the shaft 50 is not received into the slot 12 until at least a portion of the top projection 60 is blocking the through bore 14. Due to the reduce cross-sectional area, it is not possible for the coupling element 10 to clamp onto the forward end of the shaft 50.

It will be appreciated by those skilled in the art that changes can be made to the embodiments described above without departing from the broad inventive concept thereof. It is understood, therefore, that this invention is not limited to the particular embodiments disclosed.

What is claimed is:

1. A shaft coupling assembly comprising:
    a coupling element including a shaft-receiving slot having a bottom surface and a bolt receiving through bore extending through the coupling element perpendicular to the shaft receiving slot;
    a retaining bolt extendable through the coupling element bolt receiving through bore such that the retaining bolt extends at least partially into the shaft-receiving slot;
    a shaft configured for interconnection with said coupling element, the shaft comprising:
    an axial shaft body having upper and lower surfaces and terminating in a forward end;
    a bolt receiving recess in the upper shaft surface adjacent the forward shaft end; and
    the shaft body forward end having a substantially planar surface except for at least one projection extending axially from the shaft forward end, the at least one projection having an upper surface contiguous with the upper shaft surface and positioned completely above a horizontal midplane of the shaft body.

2. The shaft according to claim 1 wherein the shaft body has a given cross-sectional area and the projection has a cross-sectional area substantially less than the shaft body cross-sectional area.

3. The shaft according to claim 1 wherein the projection has a tapered tip.

4. The shaft according to claim 1 wherein the bolt receiving recess is a notch.

5. The shaft according to claim 1 wherein the bolt receiving recess is an annular groove.

6. A shaft coupling assembly comprising:
    a coupling element including a shaft-receiving slot having a bottom surface and a bolt receiving through bore extending through the coupling element perpendicular to the shaft-receiving slot, a portion of said bolt receiving through bore closest to the slot bottom surface being at a distance X from the slot bottom surface;
    a retaining bolt extendable through the coupling element bolt retaining through bore such that the retaining bolt extends at least partially into the shaft-receiving slot with a portion of the bolt at the distance X from the slot bottom surface;
    an axial shaft body having upper and lower surfaces and terminating in a forward end configured to be inserted in the shaft-receiving slot;
    a bolt receiving recess in the upper shaft surface adjacent the forward shaft end and configured to receive and retain the retaining bolt after the shaft forward end is inserted in the shaft-receiving slot; and at least one projection extending axially from the shaft forward end, the at least one projection having an upper surface contiguous with the upper shaft surface the projection upper surface being spaced from the shaft lower surface a distance greater than X.

7. The shaft coupling assembly according to claim 6 wherein the shaft-receiving slot has a given cross-sectional area, the shaft body has a cross-sectional area substantially equal to the shaft-receiving slot cross-sectional area and the projection has a cross-sectional area substantially less than the shaft-receiving slot cross-sectional area.

8. The shaft coupling assembly according to claim 6 wherein the projection has a tapered tip.

9. The shaft coupling assembly according to claim 6 wherein the bolt receiving recess is a notch.

10. The shaft coupling assembly according to claim 6 wherein the bolt receiving recess is an annular groove.

11. A shaft coupling assembly comprising:

a coupling element including a shaft-receiving slot having a bottom surface and a bolt receiving through bore extending through the coupling element perpendicular to the shaft-receiving slot, a portion of said bolt receiving through bore closest to the slot bottom surface being at a distance X from the slot bottom surface;

a retaining bolt extendable through the coupling element bolt retaining through bore such that the retaining bolt extends at least partially into the shaft-receiving slot with a portion of the bolt at the distance X from the slot bottom surface;

an axial shaft body having upper and lower surfaces and terminating in a forward end configured to be inserted in the shaft-receiving slot;

a bolt receiving recess in the upper shaft surface adjacent the forward shaft end and configured to receive and retain the retaining bolt after the shaft forward end is inserted in the shaft-receiving slot; and at least one projection extending from the shaft forward end, the at least one projection having an upper surface contiguous with the upper shaft surface, the projection upper surface being spaced from the shaft lower surface a distance greater than X wherein the bolt receiving through bore is spaced a given distance from an opening into the shaft-receiving slot and the projection has a length equal to or greater than the through bore distance.

12. A shaft coupling assembly comprising:

a coupling element including a shaft-receiving slot having a bottom surface and a bolt receiving through bore extending through the coupling element perpendicular to the shaft-receiving slot, a portion of said bolt receiving through bore closest to the slot bottom surface being at a distance X from the slot bottom surface;

a retaining bolt extendable through the coupling element bolt retaining through bore such that the retaining bolt extends at least partially into the shaft-receiving slot with a portion of the bolt at the distance X from the slot bottom surface;

an axial shaft body having upper and lower surfaces and terminating in a forward end configured to be inserted in the shaft-receiving slot;

a bolt receiving recess in the upper shaft surface adjacent the forward shaft end and configured to receive and retain the retaining bolt after the shaft forward end is inserted in the shaft-receiving slot; and at least one projection extending axially from the shaft forward end, the at least one projection having an upper surface contiguous with the upper shaft surface, the projection upper surface being spaced from the shaft lower surface a distance greater than X; and a second projection extending from the shaft forward end adjacent the shaft lower surface, the second projection substantially opposed to the projection extending adjacent the shaft upper surface with an open area defined therebetween.

13. The shaft coupling assembly according to claim 12 wherein the first and second projections are slightly flexible.

14. The shaft coupling assembly according to claim 12 wherein the shaft-receiving slot has a given cross-sectional area, the shaft body has a cross-sectional area substantially equal to the shaft-receiving slat cross-sectional area and the first and second projections have a combined cross-sectional area substantially less than the shaft-receiving slot cross-sectional area.

15. The shaft coupling assembly according to claim 12 wherein the bolt receiving through bore is spaced a given distance from an opening into the shaft-receiving slot and the first or second projection has a longitudinal length equal to or greater than the given through bore distance.

* * * * *